(12) United States Patent
Ziebell (10) Patent No.: US 6,385,767 B1
(45) Date of Patent: May 7, 2002

(54) METHOD AND SYSTEM FOR CREATING AND MANIPULATING EXTENSIONS TO VERSION CONTROL SYSTEMS

(75) Inventor: Jonathan Virgil Ziebell, Trabuco Canyon, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/409,107

(22) Filed: Sep. 30, 1999

(51) Int. Cl.$^7$ .............................................. G06F 9/445
(52) U.S. Cl. .......................... 717/11; 707/203; 707/204
(58) Field of Search ........................... 717/3, 11; 707/1, 707/200, 201, 202, 203, 204, 205; 709/216, 217, 219, 220, 221, 222, 223

(56) References Cited

U.S. PATENT DOCUMENTS

| | | | | |
|---|---|---|---|---|
| 5,537,596 A | * | 7/1996 | Yu et al. ....................... | 395/712 |
| 5,625,818 A | * | 4/1997 | Zarmer et al. ............... | 707/104 |
| 5,684,984 A | * | 11/1997 | Jones et al. .................... | 707/10 |
| 5,897,642 A | * | 4/1999 | Capossela et al. ........... | 707/203 |
| 5,905,990 A | * | 5/1999 | Inglett ......................... | 707/200 |
| 5,907,703 A | * | 5/1999 | Kronenberg et al. ........ | 709/301 |
| 5,911,776 A | * | 6/1999 | Guck .......................... | 709/217 |
| 6,044,374 A | * | 3/2000 | Nesamoney et al. .......... | 707/10 |

OTHER PUBLICATIONS

Smallwood, "Enterprise imaging follows new paths", Imaging and Document solutions, 1998, pp 55–60.*
DelRossi, "MKS RCS delivers good, fl;exible version control", InfoWorld, 1994, pp 102–108.*
Mersui, "Intersolv's PVCS version manager", Performance Computing, Jun. 1998, pp 61–66.*
Gladney, "Astorage subsystem for image and records management", IBM Systems Journal, vol. 32, No. 3, 1993, pp 512–540.*

* cited by examiner

*Primary Examiner*—Kakali Chaki
(74) *Attorney, Agent, or Firm*—Alfred W. Kozak; Mark T. Starr; Lise A. Rode (57) ABSTRACT

Disclosed is a computer system capable of executing a version control program with a method within the version control program for generating an archive object for a file having an extension XXX. The method comprising the steps of receiving a request for constructing an extension object for an extension XXX from an application capable of creating extensions followed by determining if a MetaClass has been provided for the extension XXX, and if so associating the MetaClass with the extension XXX. Further, including receiving a request for creating an archive object for the extension XXX from a version control application; from a folder revision object in the version control program, determining if the extension XXX is registered with a folder archive object corresponding to the folder revision object, and if so determining if the MetaClass is associated with the extension XXX, and if so; calling an operation to create an object in the MetaClass determined in the preceding step for construction of an archive object for the extension XXX; and, returning the archive object constructed in the previous step as an archive object for the extension XXX.

12 Claims, 8 Drawing Sheets

METHOD AND SYSTEM FOR CREATING AND MANIPULATING EXTENSIONS TO VERSION CONTROL SYSTEMS

CROSS REFERENCE TO RELATED APPLICATIONS

This patent document relates to the following patent applications, assigned to the same assignee hereof, which are incorporated herein by reference.

U.S. Ser. No. 09/409,106, entitled A SYSTEM AND METHOD FOR INCORPORATING CHANGES AS A PART OF A SOFTWARE RELEASE A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of managing the development and release of software programs and more particularly to a method for controlling versions of source code.

BACKGROUND OF THE INVENTION

Version control, also known as source code control or revision control, is a component of configuration management. The objective behind version control is to enable a particular "snapshot" of a development process to be recovered at some stage in the future (i.e. after the development has moved on in time from the snapshot time). The objectives of a typical version control system include allowing the software developer to create new versions, retrieve old versions, view changes between versions, and co-ordinate concurrent development. To be able to do this the version control system should be able to maintain a complete history of content and changes to the source code.

There are a wide variety of version control systems available to software developers. However, the prior art in this area is limited because a user is not allowed to extend the functionality of version control systems to include special handling and processing functions.

The prior art also lacks the flexibility to allow users to version all file types in a way that allows typical version control operations, such as check-out, check-in, branch, merge, history, differences, etc. to work in an efficient and informative manner.

Another problem with the prior art is that files are versioned as either text files or binary files. Text files are line-based and versions are stored as a set of changes to the lines. This method of storage is space efficient compared to storing versions of the entire file. Binary files are not line-based and versions are not typically stored in a space efficient manner. The problem is that in order to version a binary file an entirely new version of the file is stored.

Yet another problem with the prior art is that extensions to the version control system typically require modifications to the version control applications before the extensions can be utilized.

SUMMARY OF THE INVENTION

Accordingly, it is an object of this invention to provide a method for controlling versions of source code, which allows users to extend the functionality of the version control system to include special handling and processing functions.

Another object of this invention is to allow users to define their own file types and to version them in an efficient and informative manner.

Yet another object of this invention is to permit extensions to the version control system that can be utilized from version control applications that are unaware of the extension.

Still another object of this invention is to provide a method for storing versions in a manner that is appropriate for the particular file type. This eliminates the need to group all non-text file types as binary as was done in the prior art and may also eliminate the need to store entire files of new versions resulting in a savings of storage.

These and other objects, which will become apparent as the invention is described in detail below, are provided by {paraphrase broadest claim}.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a nonvolatile memory, such as a computer disk. Since the information on a computer disk remains in existence, even when the computer is turned off, an object database provides the ability to persistently store objects. An object program that uses an object database thus has the option of storing objects transiently or persistently.

Figure 1:
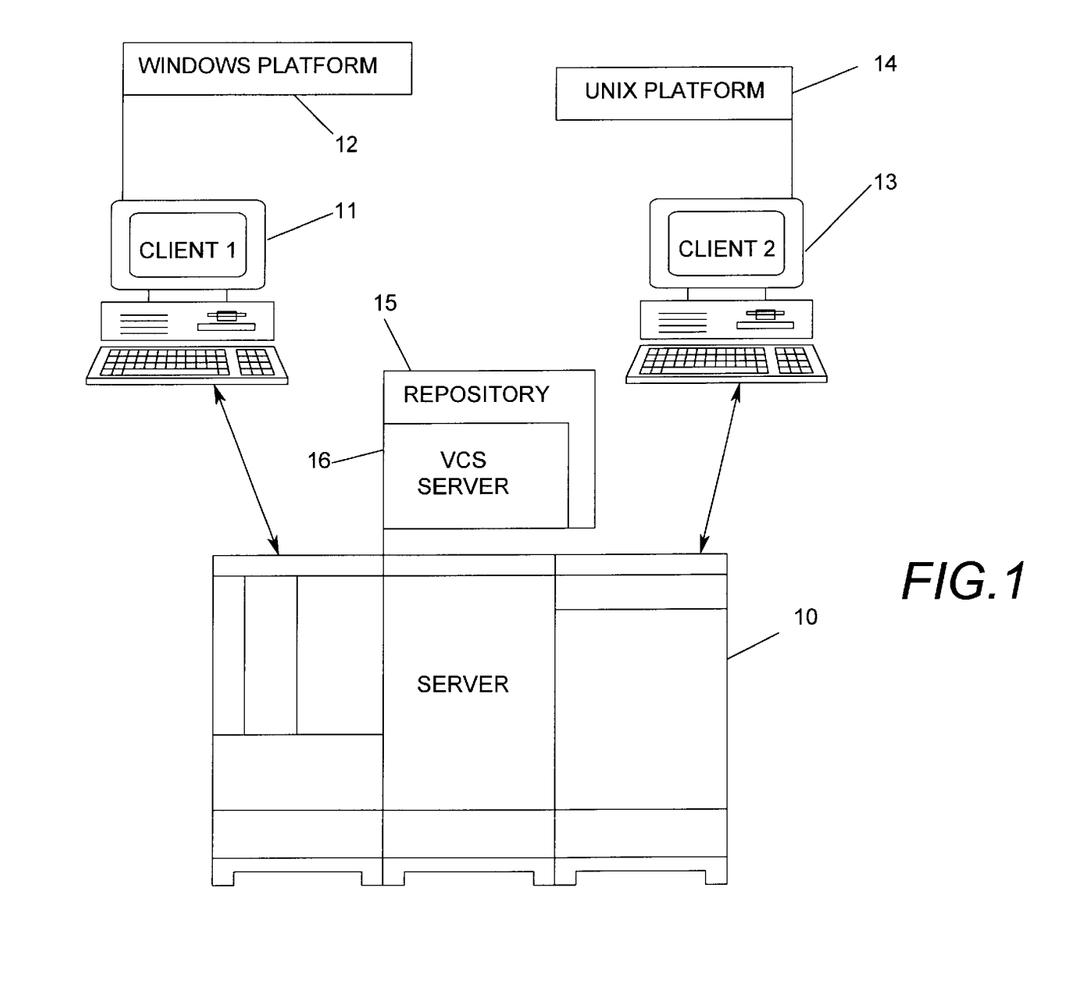
FIG. 1 is a block diagram of a computer system useful in implementing the system and method of the present invention.

Referring now to the drawings and FIG. 1 in particular, a block diagram of a computer system useful in implementing the system and method of the present invention is shown. A server 10 is adapted for coupling to a first client 11 (Client 1) operating on a Windows platform 12 for example, and a second client 13 (Client 2) operating on a UNIX platform 14 for example. The server 10 is capable of executing a repository program 15 and a Version Control System (VCS) server program 16 (within the repository program 15) in accordance with the present invention.

The repository server program 15 further includes tools for cataloging, browsing, and managing components that make up an application. Methods to support these services are disclosed in several patents and patent applications assigned to the assignee of this application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U. S. Pat. No. 5,889,992 for A METHOD FOR MAPPING TYPES IN A MODEL IN AN OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U. S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

Figure 2:
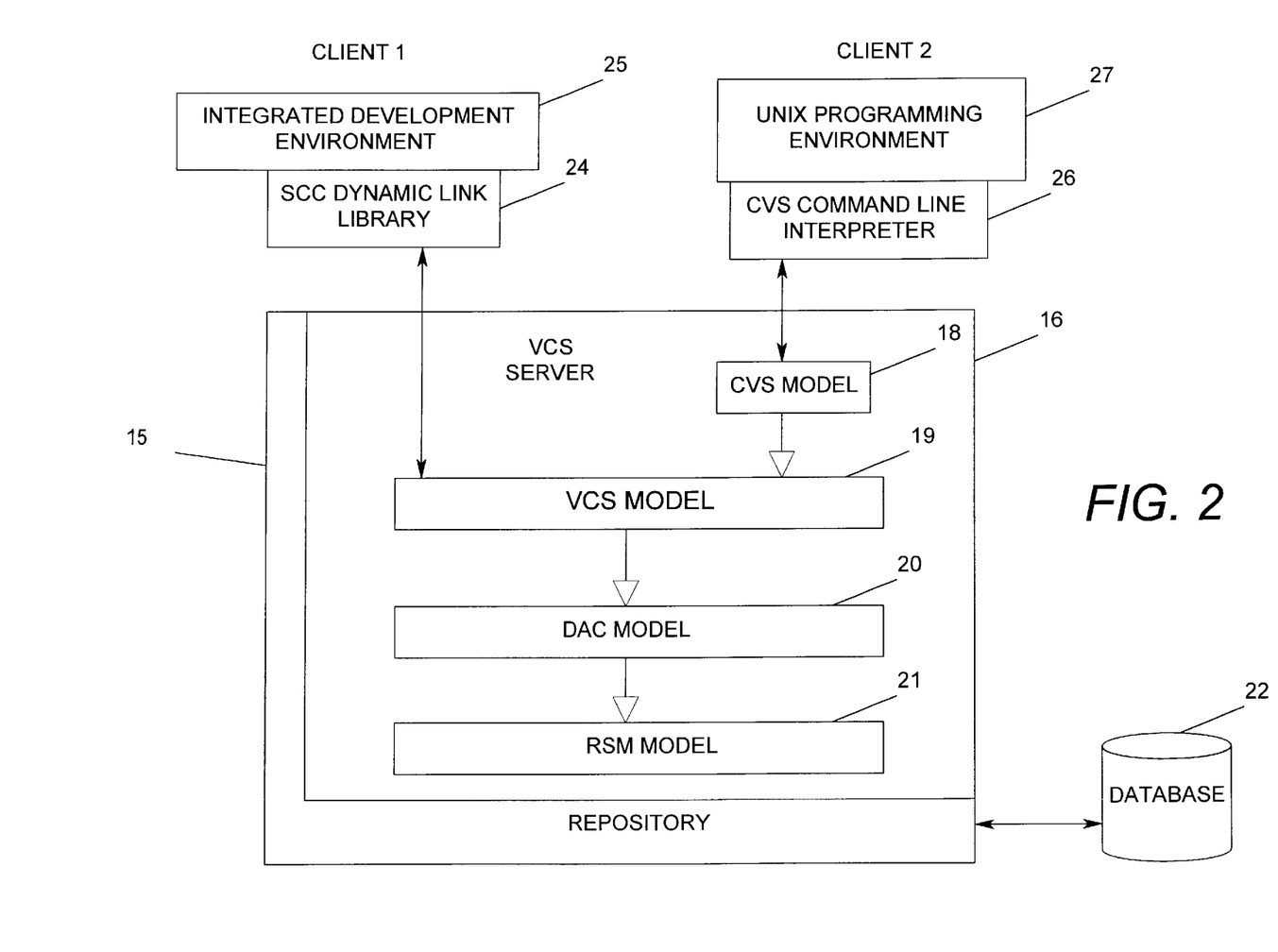
FIG. 2 is a modular block diagram of the system and method of the version control system of the present invention.

Referring now to FIG. 2, a modular block diagram of the system and method of the version control system ("VCS") of the present invention is shown. The VCS server 16 contains a Concurrent Version System ("CVS") model 18, a VCS technology model 19, a Domain Access Control ("DAC") model 20 and a Repository Services model 21. The repository program 15 is linked to a permanent storage device containing a database 22.

The computer 11 (Client 1 as shown in FIG. 1) includes a Dynamic Link Library 24 that implements a Source Code Control ("SCC") Application Program Interface ("API"). The Library 24 allows the VCS to integrate with many popular Integrated Development Environments ("IDE"), such as Environment 25. Thus, the present invention can take advantage of the standard SCC API implemented in most IDEs to allow the user to interface with the VCS server 16. When a user wants to access any of the multiplicity of functions defined in the SCC API, the Library 24 puts up a dialog box to request information from the user and to offer options to the user as may be appropriate for the called SCC function. This information is passed to one or more operations in the VCS technology model 19 to complete the set of commands defined by that SCC API function.

The computer 14 (Client 2 as shown in FIG. 1) also contains an implementation of a Concurrent Version System ("CVS") command line interpreter 26, which maps each CVS command to one or more operations in the VCS technology model 19. CVS is a popular UNIX command line oriented version control system. The interpreter 26 thus provides an interface between the user of a GUI for CVS (e.g., jCVS and tkCVS) included in a UNIX Programming environment 27 and the VCS technology model 19. The jCVS is the JAVA version of a GUI for CVS and tkCVS is another popular GUI to CVS This will permit GUIs written for CVS to work with the VCS technology model 19.

The CVS model 18 maintains information about users who are accessing the VCS model.

The VCS technology model 19 provides the configuration management functionality utilizing many of the services provided by the Repository Services Model ("RSM") 21. Some of these services are as follows:

RSM name service is used to name and locate storage for files, directories, users and project objects in the VCS model.

RSM interoperability service provides a client/server architecture across Windows and UNIX platforms.

RSM user and session service provides project user and security information.

RSM collection service and transaction service is also used by VCS.

The Domain Access Control ("DAC") model 20 provides user access control to objects in the VCS server program 16 that belong to access domains. An access domain consists of an instance of a class derived from the class AccessController defined in the DAC model 20 together with a set of persistent objects that reference the access controller in order to determine user access to their features. When a user wishes to access a feature, the operation isAccessAllowed defined in the class AccessController is called from the feature and checks to determine if the user has appropriate permission to access that feature. Only when this test is positive does the DAC model 20 allow the user to access the feature. If the DAC model 20 denies user access to a feature, an error is reported.

Figure 3:
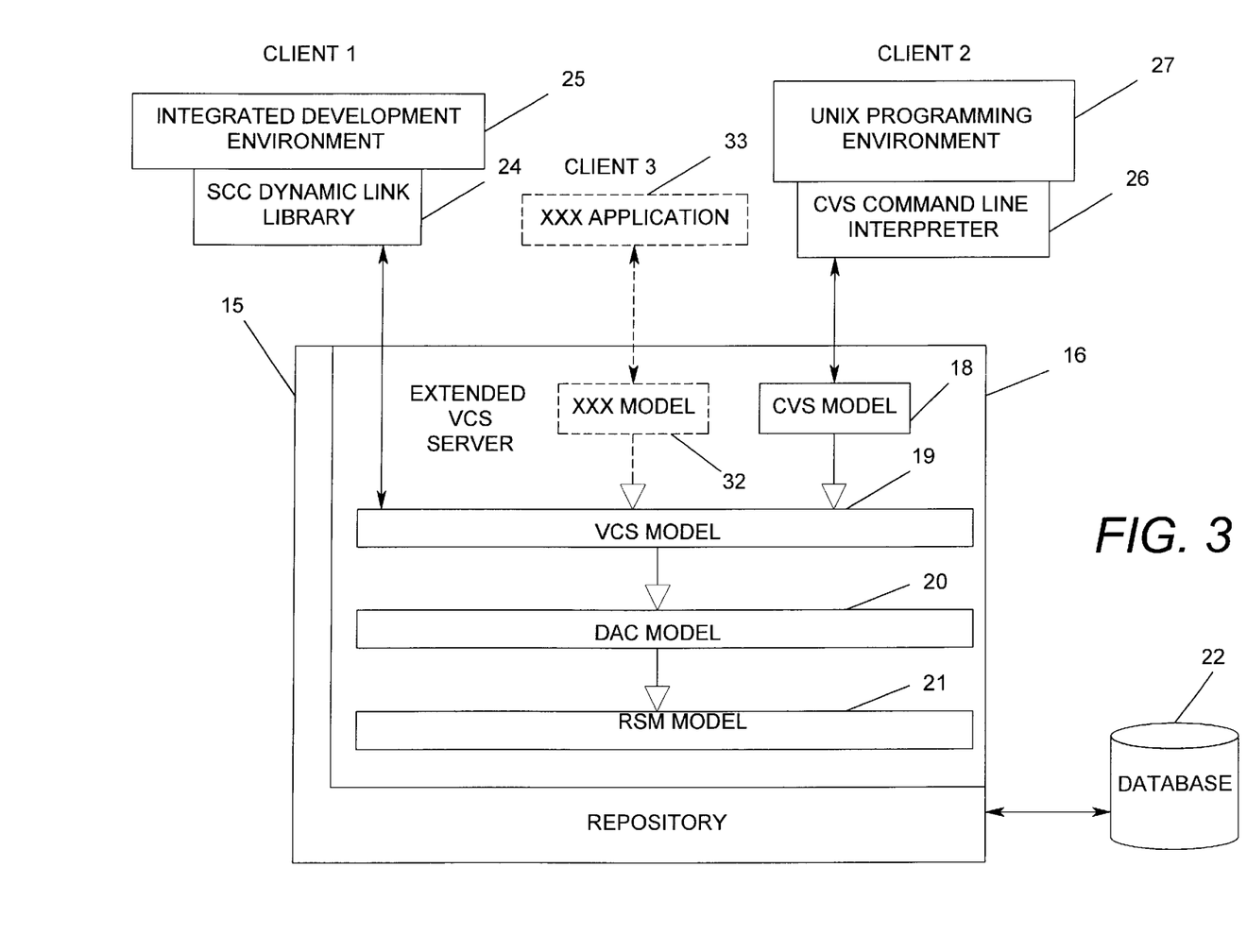
FIG. 3 is a modular block diagram of a system and method to extend the functionality of the version control system.

Referring now to FIG. 3, a modular block diagram of a system and method to extend the functionality of the version control system is shown. FIG. 3 is identical in all respects to FIG. 2 except for the addition of an XXX model 32 and an XXX application 33. The XXX model extends the functionality of the VCS technology model in a manner that is appropriate for files with the .XXX file type and the XXX application exposes new functionality provided by the XXX model. The XXX model 32 contains the classes needed to extend the VCS technology model 19. The XXX application 33 is the client application that is capable of exposing functionality in the XXX model to users.

Figure 4:
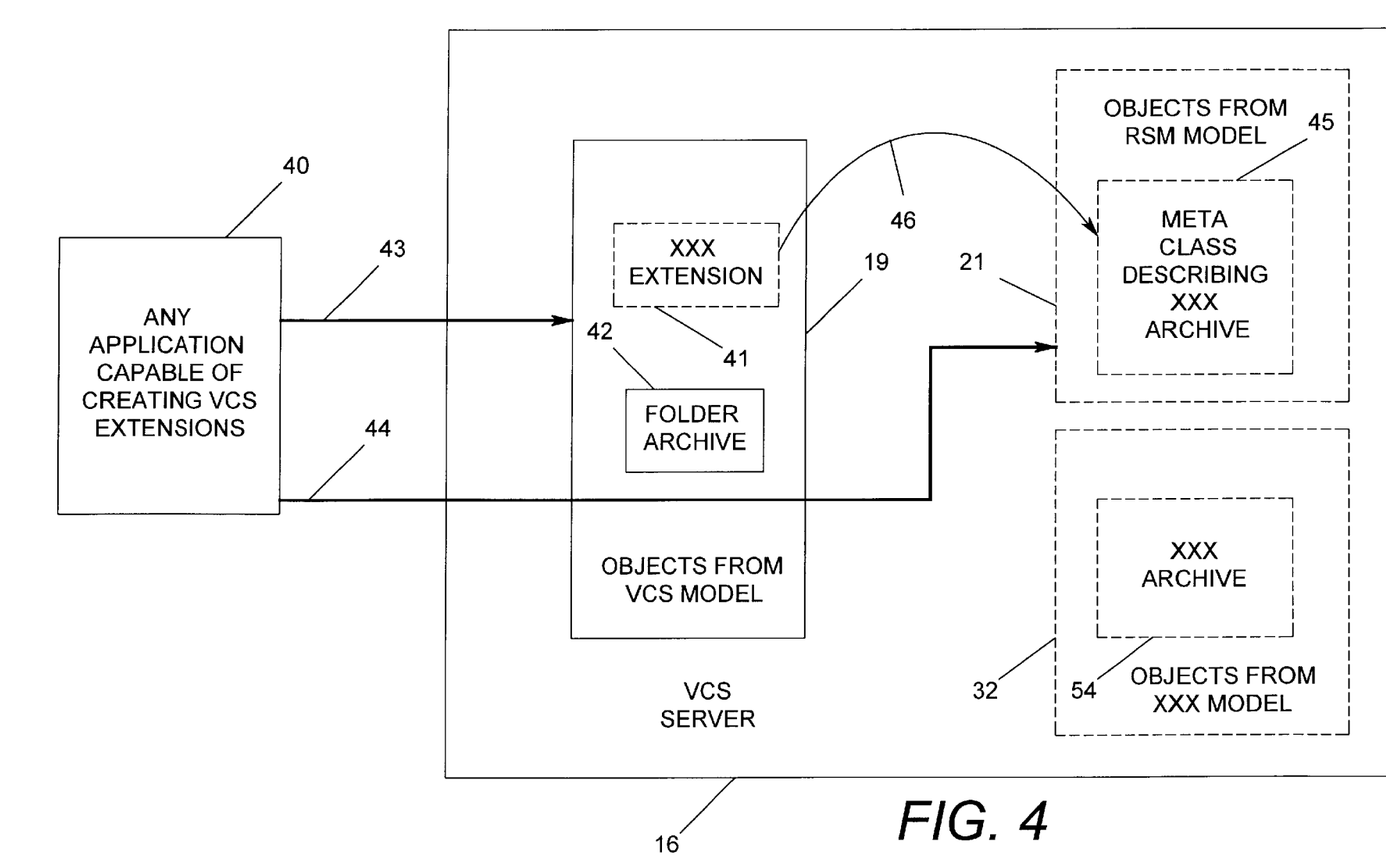
FIG. 4 is a block diagram depicting a method that allows the users to create their own extension types for versioning files in a manner that is appropriate for the file type (e.g., .XXX).

Referring now to FIG. 4, a block diagram of a method that allows the users to create their own file extension types for versioning is shown. Any application 40 with the capability of creating VCS extensions can be used to create an extension. From such an application 40, for any file extension identifier (e.g., .XXX), an Extension 41 is defined (as denoted by a line 43) as an instance of the Extension class (which is in the VCS model 19). The instance 41 of the extension class is defined for a FolderArchive class object 42 (which is also in the VCS model 19) and can be used when creating an instance of an archive (described by the MetaClass object 45) in that folder or any child folder, recursively. Next, the MetaClass class object 45 (which is in the RSM model 21) that describes an archive from the XXX model 32 can be associated with the XXX Extension 41 (as denoted by a line 46).

Figure 5A:
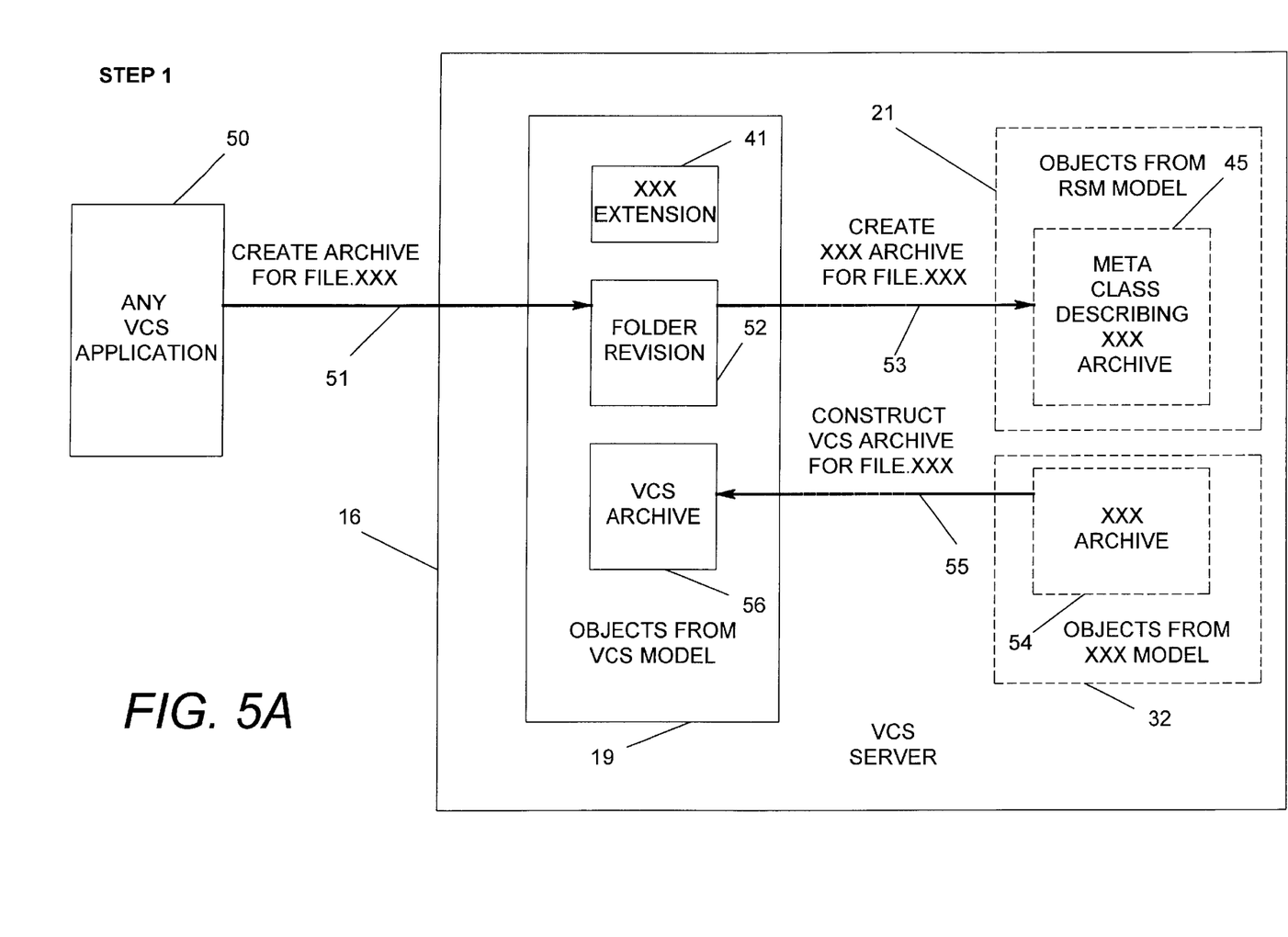
FIG. 5A is a package diagram of the first step of a method that allows users to version files in a manner that is appropriate for the file type (e.g., .XXX).
Figure 5B:
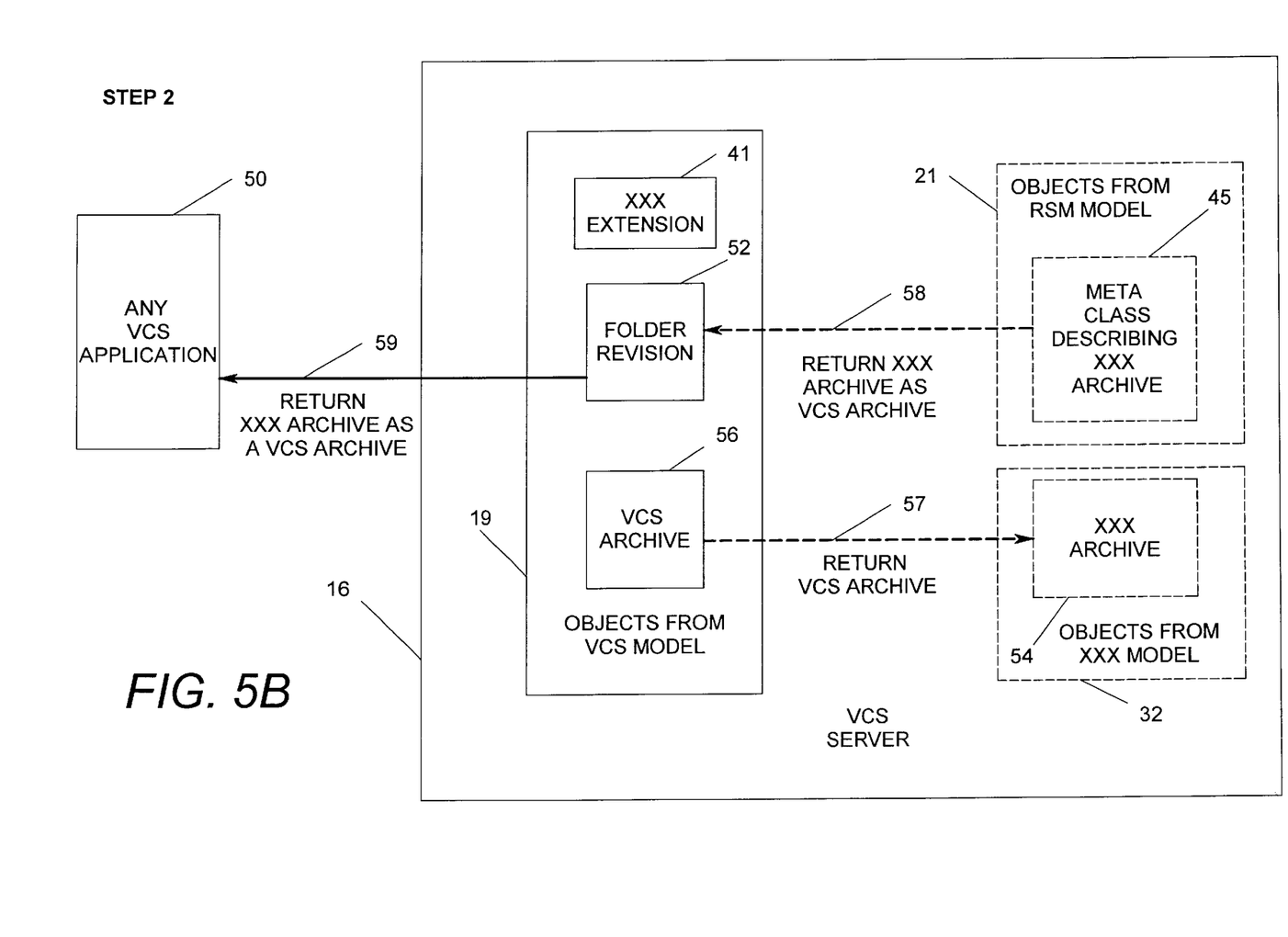
FIG. 5B is a package diagram of the second step of a method that allows users to version files in a manner that is appropriate for the file type (e.g., .XXX).

Referring to FIGS. 5A and 5B, the steps for creating an archive for a file with the XXX file extension identifier that needs to be versioned are illustrated. Module 50 is a version control application that uses the VCS model 19. The objective of FIGS. 5A and 5B is to show how it is possible to extend the VCS model 19 to create any archive (e.g., XXX Archive 54) that is a specialization of the class VCS Archive (which is in the VCS model 19). Moreover, that this can be done from any VCS application that is unaware of the specialization for a file with any file extension identifier (e.g., XXX) without having to rewrite the VCS application employed to create the archive.

With reference to FIG. 5A, which is the first step for creating an XXX Archive for a file with the file extension identifier .XXX, the Version Control Application 50 sends a request (as denoted by an arrow 51) to a FolderRevision object 52 in the VCS model 19 to create an archive for a file with the file extension identifier .XXX. Before an archive is constructed, Folder Revision 52 searches for the extension, which is defined for the FolderArchive class or any of its parent FolderArchives, recursively, and having the same name as the file extension identifier .XXX. If such an extension has been created using the process described above and illustrated in FIG. 4, Folder Revision 52 sends a request (as denoted by an arrow 53) to create an instance of the class defined by the MetaClass 45 from the RSM model 21 associated with the XXX Extension 41. This instance is an XXX Archive object 54 from the XXX model 32. On the other hand, if a XXX extension is not found by the Folder Revision, an instance of the class VCS Archive 56 (part of the VCS model) is constructed. The XXX Archive 54 can itself send a request (as denoted by an arrow 55) during its own construction to VCS Archive 56 to construct an instance VCS Archive as its base class.

Referring to FIG. 5B, which is the second step in the process of creating a VCS Archive 56 for a file with the file extension identifier .XXX, the instance of the VCS Archive class is returned (as denoted by a line 57) to the XXX Archive object 54. The instance of the XXX Archive class is returned to the MetaClass 45. The XXX Archive object is returned (as denoted by a line 58) as an instance of its base class, VCS Archive, to the Folder Revision object 52, which returns the VCS Archive (as denoted by a line 59) to the Version Control Application 50. The VCS Archive appears as a VCS Archive to the application but behaves as an XXX Archive. This completes the process for creating an archive for a file with the file extension identifier XXX. Thus, once a set of extensions has been defined for a folder archive, they can be used to create specialized archives in that folder or in any descendant folder of that folder.

Figure 6:
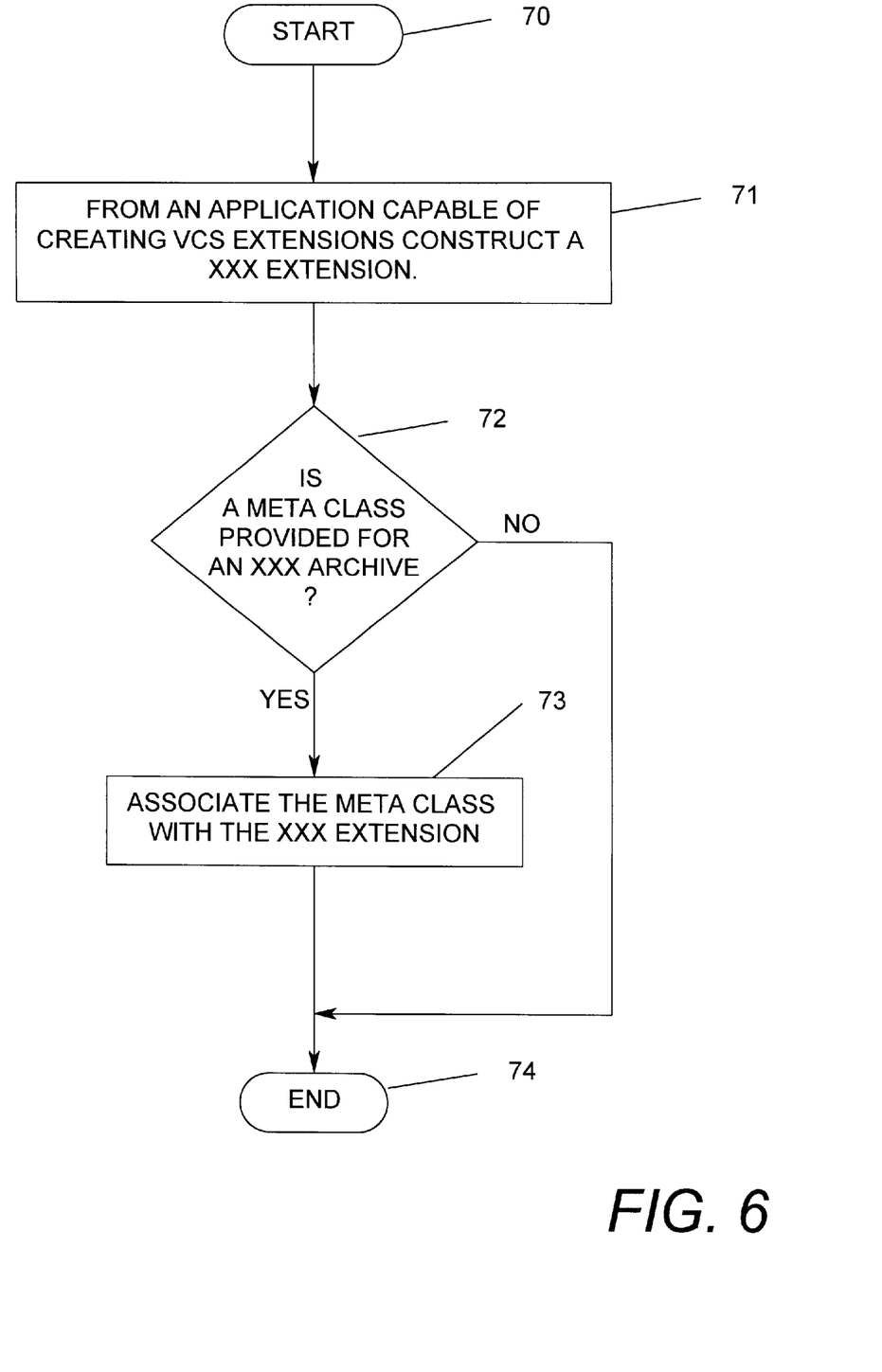
FIG. 6 is a flowchart of the process to create an extension for a file type (e.g., .XXX).

Referring now to FIG. 6, a flow chart of the process for creating an extension for the file type .XXX (as depicted by the modular diagram in FIG. 4) is shown. The process begins with a start bubble 70 followed by a step of constructing an XXX extension from a VCS Application capable of creating extensions in the VCS model (block 71). This allows a user to construct an extension for any file extension identifier (e.g., .XXX). Next, an inquiry is made as to whether or not a MetaClass has been provided for an archive that is a specialization of the VCS Archive class (diamond 72). If the result of this inquiry is yes, then an association is created with the extension (block 73) between the MetaClass and the extension for the file extension identifier .XXX. Following this the process ends (bubble 74). On the other hand, if the result of the inquiry in the diamond 72 is no, then the process ends (bubble 74) without performing the associating step 73.

Figure 7:
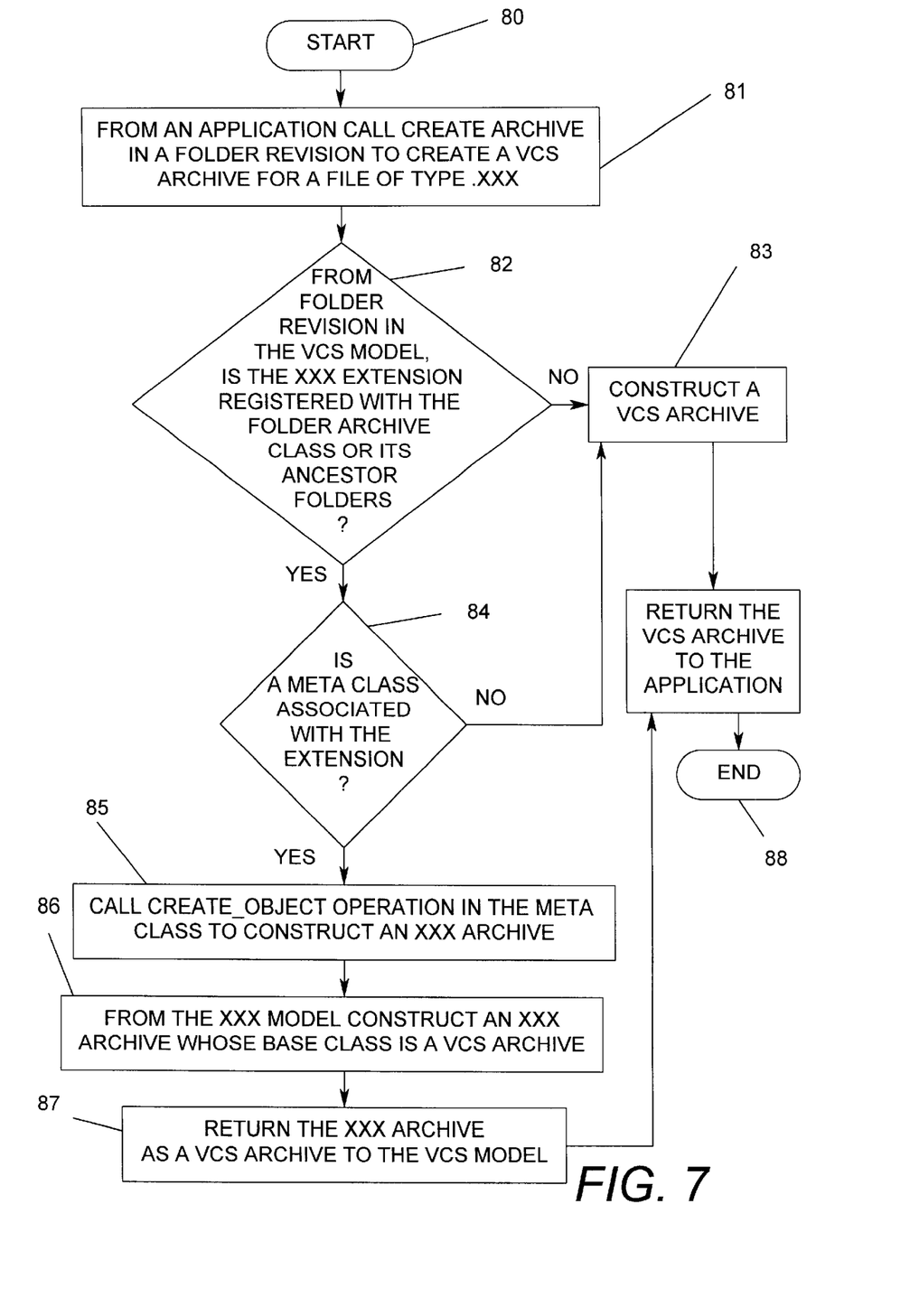
FIG. 7 is a flowchart of the process to version files in a manner that is appropriate for the file type (e.g., XXX).

Referring now to FIG. 7, a flowchart of the process to version files with a file extension identifier .XXX is shown. As depicted in FIGS. 5A and 5B, this process comprises extending the VCS model 52 to create archives for a file with any generic file extension identifier (e.g., .XXX) without having to rewrite applications that are used to version that object. This process begins with a start bubble 80 followed by a step of calling an operation in Folder Revision to create a VCS Archive for a file of type XXX from an application (block 81). Next, an inquiry is made by Folder Revision in the VCS model as to whether or not the XXX extension is registered with its folder archive or with its ancestor folders (diamond 82). If the answer to this inquiry is no, then a VCS Archive is constructed (block 83). The VCS Archive created in the previous step is returned to the application (block 88).

On the other hand, if the answer to inquiry depicted by the diamond 82 is yes, then an inquiry is made to check if a MetaClass object is registered with the XXX extension (diamond 84). If the answer to this inquiry is no, then again a default VCS Archive is constructed (block 83). The VCS Archive created in the previous step is returned to the application (block 88). On the other hand, if the answer to this inquiry is yes, then a call is made to the create object in the MetaClass object to create an instance of an XXX Archive from the XXX model as described by the MetaClass (block 85). During the creation of the XXX Archive in the previous step the XXX Archive under construction in turn creates an instance of its base class, a VCS archive (block 86). The XXX Archive is return to the Folder Revision in the VCS model as an instance of its base class, VCS Archive (block 87). Finally, the VCS Archive for the file with file extension identifier XXX is returned to the Version Control Application as a VCS Archive that behaves as an XXX Archive (block 88). After this, the process ends (bubble 89).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system capable of executing a version control program, a method within said version control program for generating an archive object for a file having an extension XXX, said method comprising the steps of:
   a. receiving a request for constructing an extension object for an extension XXX from an application capable of creating extensions;
   b. determining if a MetaClass has been provided for said extension XXX, and if so;
   c. associating said MetaClass with said extension XXX;
   d. receiving a request for creating an archive object for said extension XXX from a version control application;
   e. from a folder revision object in said version control program, determining if said extension XXX is registered with a folder archive object corresponding to said folder revision object, and if so;
   f. determining if said MetaClass is associated with said extension XXX, and if so;
   g. calling an operation to create an object in said Meta-Class determined in the preceding step for construction of an archive object for said extension XXX; and,
   h. returning said archive object constructed in the previous step as an archive object for said extension XXX.

2. The method as in claim 1 where in step b no MetaClass has been provided for said extension XXX, further including the steps of creating said extension XXX without associating said extension XXX with said MetaClass and returning to said version control application.

3. The method as in claim 1 where in step e thereof it is determined that said extension XXX is not registered, further including the steps of constructing an archive object and returning said archive object to said version control application.

4. The method as in claim 1 where in step f thereof it is determined that no MetaClass is associated with said extension XXX, further including the steps of constructing an archive object and returning said archive object to said version control application.

5. The method as in claim 1 where in step c thereof, further including the steps of validating a construction operation in a class described by said MetaClass to determine if it matches a construct operation of said archive.

6. The method as in claim 1 where in step e thereof, further including the steps of calling a findExtension operation to determine if said extension XXX is registered with all ancestors of said folder archive object.

7. A storage medium encoded with machine-readable computer program code in a computer system capable of executing a version control program, a method within said version control program for incorporating changes to software releases, wherein, when the computer program code is executed by a computer, the computer performs the steps of:
   a. receiving a request for constructing an extension object for an extension XXX from an application capable of creating extensions;
   b. determining if a MetaClass has been provided for said extension XXX, and if so;
   c. associating said MetaClass with said extension XXX;
   d. receiving a request for creating an archive object for said extension XXX from a version control application;
   e. from a folder revision object in said version control program, determining if said extension XXX is registered with a folder archive object corresponding to said folder revision object, and if so;
   f. determining if said MetaClass is associated with said extension XXX, and if so;
   g. calling an operation to create an object in said Meta-Class determined in the preceding step for construction of an archive object for said extension XXX; and,
   h. returning said archive object constructed in the previous step as an archive object for said extension XXX.

8. The storage medium as in claim 7 where in step b no MetaClass has been provided for said extension XXX, further including the steps of creating said extension XXX without associating said extension XXX with said Meta-Class and returning to said version control application.

9. The storage medium as in claim 7 where in step e thereof it is determined that said extension XXX is not registered, further including the steps of constructing an archive object and returning said archive object to said version control application.

10. The storage medium as in claim 7 where in step f thereof it is determined that no MetaClass is associated with said extension XXX, further including the steps of constructing an archive object and returning said archive object to said version control application.

11. The storage medium as in claim 7 where in step c thereof, further including the steps of validating a construction operation in a class described by said MetaClass to determine if it matches a construct operation of said archive.

12. The storage medium as in claim 7 where in step e thereof, further including the steps of calling a findExtension operation to determine if said extension XXX is registered with all ancestors of said folder archive object.

* * * * *